(12) United States Patent
Koh et al.

(10) Patent No.: US 11,637,310 B2
(45) Date of Patent: Apr. 25, 2023

(54) LITHIUM SECONDARY BATTERY INCLUDING SULFONE-BASED ADDITIVE

(71) Applicants: Samsung Electronics Co., Ltd., Suwon-si (KR); Samsung SDI Co., Ltd., Yongin-si (KR)

(72) Inventors: Myongchun Koh, Hwaseong-si (KR); Insun Park, Suwon-si (KR); Jihyun Jang, Seoul (KR); Yeonji Chung, Yongin-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 286 days.

(21) Appl. No.: 16/101,927

(22) Filed: Aug. 13, 2018

(65) Prior Publication Data

US 2019/0058213 A1 Feb. 21, 2019

(30) Foreign Application Priority Data

Aug. 16, 2017 (KR) .......... 10-2017-0103719

(51) Int. Cl.
*H01M 4/505* (2010.01)
*H01M 4/525* (2010.01)
*H01M 10/0567* (2010.01)
*H01M 10/0525* (2010.01)
*H01M 10/0565* (2010.01)
*H01M 10/0569* (2010.01)
*H01M 4/02* (2006.01)

(52) U.S. Cl.
CPC ....... *H01M 10/0525* (2013.01); *H01M 4/505* (2013.01); *H01M 4/525* (2013.01); *H01M 10/0565* (2013.01); *H01M 10/0567* (2013.01); *H01M 10/0569* (2013.01); *H01M 2004/027* (2013.01); *H01M 2004/028* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 5,580,684 A | 12/1996 | Yokoyama et al. | |
| 5,993,997 A | 11/1999 | Fujimoto et al. | |
| 6,723,473 B1 | 4/2004 | Takafumi et al. | |
| 7,709,142 B2 | 5/2010 | Wakita et al. | |
| 8,241,795 B2 | 8/2012 | Ihara et al. | |
| 8,252,465 B2 | 8/2012 | Kim et al. | |
| 9,029,022 B2 | 5/2015 | Miyagi et al. | |
| 2001/0009744 A1 | 7/2001 | Kim et al. | |
| 2004/0048163 A1 | 3/2004 | Park et al. | |
| 2004/0157133 A1 | 8/2004 | Kim et al. | |
| 2004/0214091 A1 | 10/2004 | Lim et al. | |
| 2005/0164087 A1* | 7/2005 | Fujita | H01M 10/0525 429/231.9 |
| 2006/0275668 A1* | 12/2006 | Peres | H01M 4/13 429/231.8 |
| 2012/0219866 A1 | 8/2012 | Onuki et al. | |
| 2013/0177822 A1 | 7/2013 | Taki et al. | |
| 2015/0064549 A1 | 3/2015 | Pinnell et al. | |
| 2015/0303417 A1* | 10/2015 | Koeder | H01M 10/0525 429/164 |
| 2018/0013168 A1* | 1/2018 | Yu | H01M 4/485 |

(Continued)

FOREIGN PATENT DOCUMENTS

| CN | 1543005 A | 11/2004 |
|---|---|---|
| CN | 101197455 A | 6/2008 |

(Continued)

OTHER PUBLICATIONS

Cheralathan et al., "Preparation of spherical LiNi0.80Co0.15Mn0.05O2 lithium-ion cathode material by continuous co-precipitation", Journal of Powers Sources, 195, 2010, pp. 1486-1494.
European Search Report for corresponding European Patent Application No. 18188875.1, dated Dec. 7, 2018.
Liu et al., "Synthesis of spherical LiNi0.8Co0.15Al0.05O2 cathode materials for lithium-ion batteries by a co-oxidation-controlled crystallization method", Chinese Chemical Letters, 22, 2011, pp. 1099-1102.
KR Office Action dated Mar. 7, 2022 of KR Patent Application No. 10-2017-0103719.
CN Office Action dated Feb. 28, 2023 of CN Patent Application No. 201810914179.X.

(Continued)

*Primary Examiner* — Haixia Zhang
(74) *Attorney, Agent, or Firm* — Cantor Colburn LLP

(57) ABSTRACT

A lithium secondary battery includes: a positive electrode; a negative electrode; and an electrolyte between the positive electrode and the negative electrode, wherein the positive electrode includes a positive active material represented by Formula 1, and the electrolyte includes a lithium salt, a non-aqueous solvent, and a sulfone compound represented by Formula 2.
wherein, in Formula 1, 0.9≤x≤1.2, 0.7≤y≤0.98, 0≤z<0.2, M comprises Al, Mg, Mn, Co, Fe, Cr, V, Ti, Cu, B, Ca, Zn, Zr, Nb, Mo, Sr, Sb, W, Bi, or a combination thereof, and A is a monovalent anion, a divalent anion, or a combination thereof, and in Formula 2, $R_1$ and $R_2$ are each independently a halogen, an unsubstituted $C_1$-$C_{10}$ alkyl group, or a $C_1$-$C_{10}$ alkyl group substituted with a halogen, and a1 and a2 are each independently an integer from 0 to 5.

Formula 1

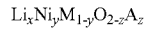

Formula 2

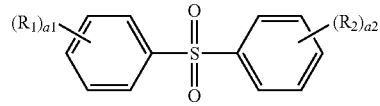

15 Claims, No Drawings

(56) References Cited

U.S. PATENT DOCUMENTS

| | | | |
|---|---|---|---|
| 2018/0065997 A1 | 3/2018 | Koh et al. | |
| 2018/0219258 A1 | 8/2018 | Roy et al. | |
| 2020/0144670 A1 | 5/2020 | Yoshida et al. | |

FOREIGN PATENT DOCUMENTS

| | | | |
|---|---|---|---|
| JP | 2011071098 A | 4/2011 | |
| JP | 2011175959 A | 9/2011 | |
| JP | 2014003029 A | 1/2014 | |
| KR | 1020010057369 A | 7/2001 | |
| KR | 1020010086281 A | 9/2001 | |
| KR | 1020130011154 A | 1/2013 | |
| KR | 101542420 A | 7/2015 | |
| KR | 1020150145980 A | 12/2015 | |
| KR | 1020160055083 A | 5/2016 | |
| WO | 2012105510 A1 | 8/2012 | |
| WO | 2014035583 A1 | 3/2014 | |

* cited by examiner

LITHIUM SECONDARY BATTERY INCLUDING SULFONE-BASED ADDITIVE

CROSS-REFERENCE TO RELATED APPLICATION

This application claims priority to and the benefit of Korean Patent Application No. 10-2017-0103719, filed on Aug. 16, 2017, in the Korean Intellectual Property Office, and all the benefits accruing therefrom under 35 U.S.C. § 119, the content of which is incorporated herein by reference in its entirety.

BACKGROUND

1. Field

The present disclosure relates to a lithium secondary battery including a sulfone-based additive.

2. Description of the Related Art

Lithium batteries may be used as power sources for portable electronic devices, such as video cameras, mobile phones, laptop computers, and the like. A rechargeable lithium battery, e.g., a lithium secondary battery, may have a specific energy that is three or more times greater than a lead storage battery, a nickel-cadmium battery, a nickel-hydrogen battery, a nickel-zinc battery, and the like, and may be rapidly charged.

In general, a lithium secondary battery utilizes a lithium-containing metal oxide as a positive active material included in a positive electrode. For example, a composite oxide of lithium and a metal such as cobalt (Co), manganese (Mn), nickel (Ni), or a combination thereof, may be used. Of these positive active materials, a positive active material containing a relatively high content of Ni (high-Ni positive active material) has the potential to implement a higher-capacity battery, as compared to a battery including, for example, a lithium cobalt oxide.

However, when a high-Ni positive active material is used, the positive electrode may have a weak surface structure, resulting in poor lifetime characteristics and increased battery resistance.

Therefore, it would be beneficial to provide a lithium secondary battery including a high-Ni positive active material and having high capacity and improved lifetime characteristics.

SUMMARY

Provided is a lithium secondary battery having a novel structure.

Additional aspects will be set forth in part in the description which follows and, in part, will be apparent from the description, or may be learned by practice of the presented embodiments.

According to an aspect of an embodiment, a lithium secondary battery includes: a positive electrode; a negative electrode; and an electrolyte between the positive electrode and the negative electrode, wherein the positive electrode includes a positive active material represented by Formula 1, and the electrolyte includes a lithium salt, a non-aqueous solvent, and a sulfone compound represented by Formula 2:

Formula 1

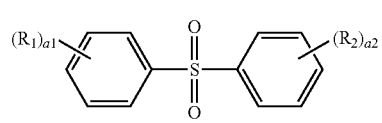

Formula 2 wherein, in Formula 1,
$0.9 \leq x \leq 1.2$, $0.7 \leq y \leq 0.98$, $0 \leq z < 0.2$,
M includes Al, Mg, Mn, Co, Fe, Cr, V, Ti, Cu, B, Ca, Zn, Zr, Nb, Mo, Sr, Sb, W, Bi, or a combination thereof; and
A includes a monovalent anion, a divalent anion, a trivalent anion or a combination thereof, and in Formula 2,
$R_1$ and $R_2$ are each independently a halogen, an unsubstituted $C_1$-$C_{10}$ alkyl group, or a $C_1$-$C_{10}$ alkyl group substituted with a halogen,
a1 and a2 are each independently an integer of 0 to 5, and each $R_1$ is the same or different when a1 is 2 or greater; and
each $R_2$ is the same or different when a2 is 2 or greater.

A method of preparing the lithium secondary battery includes disposing the electrolyte between the positive electrode and the negative electrode.

A method of preparing a lithium secondary battery includes: providing a positive electrode and a negative electrode; and disposing an electrolyte between the positive electrode and the negative electrode, wherein the positive electrode comprises a positive active material represented by Formula 1, and the electrolyte comprises a lithium salt, a non-aqueous solvent, and a sulfone compound represented by Formula 2:

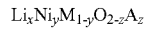

Formula 1

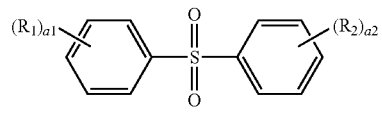

Formula 2 wherein, in Formula 1, $0.9 \leq x \leq 1.2$, $0.7 \leq y \leq 0.98$, $0 \leq z < 0.2$, M comprises Al, Mg, Mn, Co, Fe, Cr, V, Ti, Cu, B, Ca, Zn, Zr, Nb, Mo, Sr, Sb, W, Bi, or a combination thereof, and A is a monovalent anion, a divalent anion, a trivalent anion or a combination thereof, and in Formula 2, $R_1$ and $R_2$ are each independently a halogen, an unsubstituted $C_1$-$C_{10}$ alkyl group, or a $C_1$-$C_{10}$ alkyl group substituted with a halogen, a1 and a2 are each independently an integer from 0 to 5, each $R_1$ is the same or different when a1 is 2 or greater, and each $R_2$ is the same or different when a2 is 2 or greater.

DETAILED DESCRIPTION

Reference will now be made in detail to various embodiments. In this regard, the present embodiments may have different forms and should not be construed as being limited to the descriptions set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An "alkyl" means a straight or branched chain, saturated, monovalent hydrocarbon group (e.g., methyl or hexyl).

A "halogen" means one of the elements of Group 17 of the periodic table (e.g., fluorine, chlorine, bromine, iodine, and astatine).

A "vinyl" group includes any group having terminal unsaturation (—$CH_2$=$CH_2$), including acrylate groups (—$OC(O)CH$=$CH_2$).

Hereinafter, example embodiments of a lithium secondary battery will now be described in greater detail.

According to an aspect of the present disclosure, a lithium secondary battery includes: a positive electrode; a negative electrode; an electrolyte disposed between the positive electrode and the negative electrode, wherein the positive electrode includes a positive active material represented by Formula 1, and the electrolyte includes a lithium salt, a non-aqueous solvent, and a sulfone compound represented by Formula 2.

Formula 1

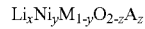

Formula 2

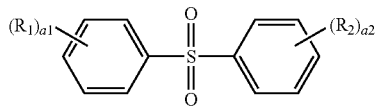

In Formula 1,
$0.9 \leq x \leq 1.2$, $0.7 \leq y \leq 0.98$, $0 \leq z < 0.2$,
M includes Al, Mg, Mn, Co, Fe, Cr, V, Ti, Cu, B, Ca, Zn, Zr, Nb, Mo, Sr, Sb, W, Bi, or a combination thereof; and
A is a monovalent anion, a divalent anion, a trivalent anion or a combination thereof.

In Formula 2,
$R_1$ and $R_2$ may each independently be a halogen, an unsubstituted $C_1$-$C_{10}$ alkyl group, or a $C_1$-$C_{10}$ alkyl group substituted with a halogen;
a1 and a2 may each independently be an integer selected from 0 to 5;
$R_1$ may be the same or differ from one another when a1 is 2 or greater; and
$R_2$ may be the same or different when a2 is 2 or greater.

In an embodiment, the a1 and a2 satisfies the following equation: $a1+a2 \geq 1$ While not wanting to be bound by theory, it is understood that a lithium metal composite oxide having a high Ni content may cause serious deterioration in the lifetime characteristics of a lithium battery, specifically reduced capacity retention or an increased internal resistance, in spite of the ability of the lithium metal composite oxide to implement a high-capacity battery. Due to these drawbacks, it has been difficult to commercialize the lithium metal composite oxide having a high Ni content. Without being limited by theory, it is understood that the reduced capacity retention and/or increase in the internal resistance are primarily caused by the release of $Ni^{3+}$ cations from the positive electrode to the electrolyte or from irreversible disproportionation of the lithium nickel composite oxide in which NiO is formed via conversion of some of the $Ni^{3+}$ cations to $Ni^{4+}$ cations during discharging of the battery. To address these drawbacks, it has been advantageously discovered that the lithium secondary battery according to an embodiment including a sulfone compound (also referred to herein as a sulfone-based compound) represented by Formula 2 in the electrolyte, is able to substantially reduced or prevent the release of $Ni^{3+}$ cations and effectively prevent disproportionation.

In particular, the sulfone-based compound of Formula 2 has a high affinity for $Ni^{3+}$ cations and thus may inhibit the side reactions attributed to $Ni^{3+}$ cations, and in particular, may maintain a high affinity for the $Ni^{3+}$ cations even when a battery is operated at a high voltage, thereby inhibiting the release of $Ni^{3+}$ cations, the oxidation of $Ni^{3+}$ cations into $Ni^{4+}$ cations, and disproportionation.

In an embodiment, the amount of the sulfone-based compound in the electrolyte may be about 3 weight percent (wt %) or less, based on a total weight of the electrolyte.

In particular, the sulfone-based compound may be added in an amount sufficient to protect $Ni^{3+}$ cations and maintain lifetime characteristics of the battery. When the amount of the sulfone-based compound exceeds 3 wt %, the sulfone-based compound itself may be seriously decomposed, thereby increasing film resistance, e.g., resistance of a solid electrolyte interphase (SEI), and deteriorating battery capacity, storage stability, and cycle characteristics.

For example, the amount of the sulfone-based compound may be from about 0.5 wt % or greater to about 3 wt % or less, based on a total weight of the electrolyte. In an embodiment, the amount of the sulfone-based compound may be from about 0.5 wt % or greater to about 2.5 wt % or less, and in some other embodiments, about 0.5 wt % or greater to about 2.0 wt % or less, and in still other embodiments, about 0.5 wt % or greater to about 1.5 wt % or less, and in yet other embodiments, about 0.5 wt % or greater to about 1 wt % or less, based on a total weight of the electrolyte. In an embodiment, the amount of the sulfone-based compound may be about 0.5 wt %, 0.6 wt %, 0.7 wt %, 0.8 wt % or about 0.9 wt % to about 3 wt %, 2.8 wt %, 2.6 wt %, 2.4 wt %, about 2.2 wt %, or about 2 wt %, based on a total weight of the electrolyte When the amount of the sulfone-based compound is less than 0.5 wt %, the effect of the sulfone-based compound on suppressing gas generation in the battery is understood to be minimal. The sulfone-based compound may inhibit gas generation caused by reaction of a positive electrode or a negative electrode with a solvent of the electrolyte, thus providing a resistance reduction effect and preventing thickness expansion in a battery during charging, or during storage after charging of the battery. However, if an ester-based compound (for example, γ-butyrolactone) is used as the solvent, the release of $Ni^{3+}$ cations or the oxidation of $Ni^{3+}$ cations into $Ni^{4+}$ cations and disproportionation may not be sufficiently inhibited, even with use of 0.5 wt % or greater of the sulfone-based compound, leading to concern about deterioration in battery capacity, storage stability, and cycle characteristics.

In an embodiment, in Formula 2, $R_1$ and $R_2$ may each independently be a halogen, an unsubstituted $C_1$-$C_{10}$ alkyl group, or a substituted $C_1$-$C_{10}$ alkyl group. For example, the $C_1$-$C_{10}$ alkyl group may be a methyl group, an ethyl group, a n-propyl group, an iso-propyl group, a butyl group, a sec-butyl group, a tert-butyl group, or an iso-butyl group. However, embodiments are not limited thereto.

For example, $R_1$ and $R_2$ may each independently be —F, —Cl, —Br, —I, a methyl group, an ethyl group, a n-propyl group, an iso-propy group, an n-butyl group, an iso-butyl group, a t-butyl group, a trifluoromethyl group, or a tetrafluoroethyl group.

For example, $R_1$ and $R_2$ may each independently be —F, —Cl, —Br, —I, or a trifluoromethyl group. In an embodiment, at least one of a1 and a2 is 1 to 5.

In an embodiment, $R_1$ and $R_2$ may be the same or may differ from one another. For example, $R_1$ and $R_2$ may each be a fluoro group (—F) or a trifluoromethyl group (—$CF_3$). For example, $R_1$ may be a fluoro group (—F), and $R_2$ may be a trifluoromethyl group (—$CF_3$).

In an embodiment, the sulfone-based compound may include a compound of Compounds 1 to 16, or a combination thereof.

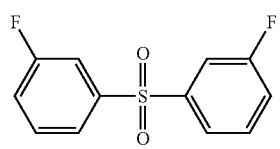

Compound 1

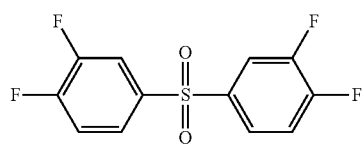

Compound 2

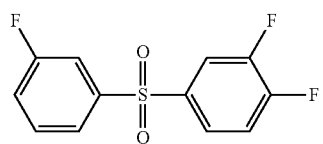

Compound 3

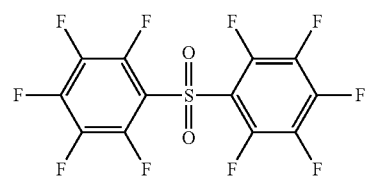

Compound 4

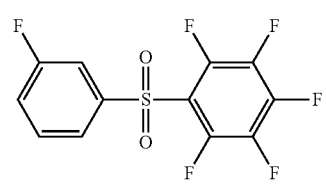

Compound 5

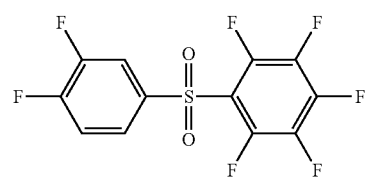

Compound 6

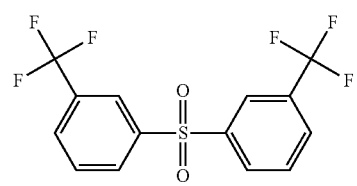

Compound 7

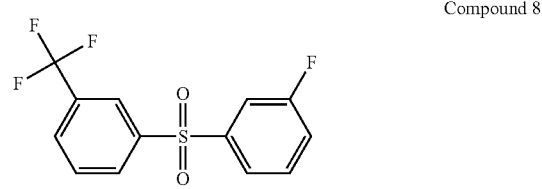

Compound 8

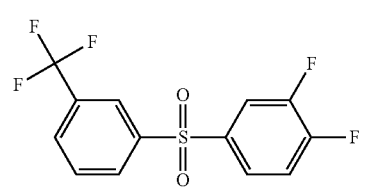

Compound 9

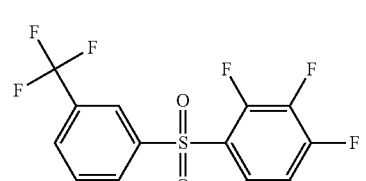

Compound 10

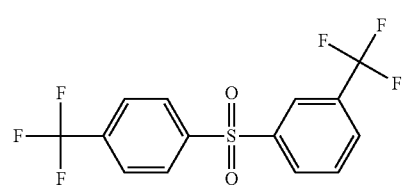

Compound 11

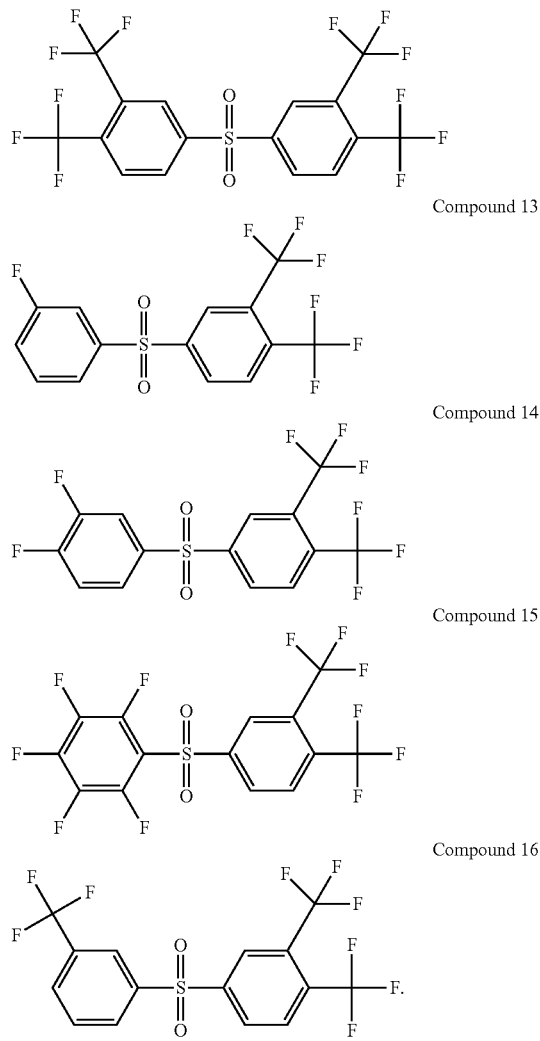

Compound 12
Compound 13
Compound 14
Compound 15
Compound 16

In an embodiment, the electrolyte may include a lithium salt. The lithium salt may serve as a source of lithium ions in the battery, and may be dissolved in an organic solvent, for example, to facilitate migration of lithium ions between the positive electrode and the negative electrode.

An anion of the lithium salt in the electrolyte may include $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (wherein x is a natural number, e.g., $1 \le x \le 8$), $(C_xF_{2x+1}SO_2)(C_yF_{2y+1}SO_2)N^-$ (wherein x and y are natural numbers, e.g., $1 \le x \le 8$ and $1 \le y \le 8$), a halide, or a combination thereof.

For example, the lithium salt may include lithium difluoro (oxalato)borate (LiDFOB), lithium bis(oxalato)borate (LiBOB), lithium difluorobis(oxalato)phosphate (LiDFOP), $LiBF_4$, $LiPF_6$, $LiCF_3SO_3$, $(CF_3SO_2)_2NLi$, $(FSO_2)_2NLi$, or a combination thereof. For example, the lithium salt may be $LiPF_6$.

At least two of the above-listed lithium salts may be used in combination. In an embodiment, the lithium salt may include $LiPF_6$ as a primary (main) salt, and one or more additional salts, for example, lithium difluoro(oxalato)borate(LiDFOB), LiBOB(lithium bis(oxalate)borate), LiDFOP (lithium difluoro bis(oxalate) phosphate), $LiBF_4$, $LiCF_3SO_3$, $(CF_3SO_2)_2NLi$, $(FSO_2)_2NLi$, or a combination thereof, in an amount not exceeding the amount of the primary salt. For example, the amount of $LiPF_6$ may be about 0.6 molar (M) to about 2.0 M $LiPF_6$, or about 0.8 M to about 1.8 M, or about 1 M to about 1.5 M.

In another embodiment, the lithium salt may include about 1 M to 1.5 M $LiPF_6$ as a primary salt, and one or more additional salts, for example, lithium difluoro(oxalato)borate (LiDFOB), lithium bis(oxalate)borate (LiBOB), lithium difluorobis(oxalate) phosphate (LiDFOP), $LiBF_4$, $LiCF_3SO_3$, $(CF_3SO_2)_2NLi$, $(FSO_2)_2NLi$, or a combination thereof, in an amount of about 0.5 wt % to about 10 wt %, or about 0.5 wt % to about 7.5 wt %, or about 1 wt % to about 5 wt %, based on a total weight of the electrolyte.

For example, the non-aqueous solvent may include a carbonate solvent, a ketone solvent, an ester solvent, an aprotic solvent, or a combination thereof.

Non-limiting examples of the carbonate solvent include carbonate-based solvents such as dimethyl carbonate (DMC), diethyl carbonate (DEC), ethyl methyl carbonate (EMC), dipropyl carbonate (DPC), methylpropyl carbonate (MPC), ethylpropyl carbonate (EPC), ethylene carbonate (EC), propylene carbonate (PC), butylene carbonate (BC), or a combination thereof. An example of the ketone solvent is a ketone-based solvent such as cyclohexane. Non-limiting examples of the ester solvent include ester-based solvents such as methyl acetate, ethyl acetate, n-propyl acetate, t-butyl acetate, methyl propionate, ethyl propionate, γ-butyrolactone, decanolide, valerolactone, mevalonolactone, caprolactone, or a combination thereof.

The aprotic solvent may be used alone or in combination with at least one of the other solvents. For example, a volume ratio of these solvents may be appropriately selected according to the performance of a battery. As used herein, the term "aprotic solvent" refers to a solvent which cannot donate hydrogen to form a hydrogen bond.

In an embodiment, the non-aqueous solvent may be a mixed solvent including a cyclic carbonate and a linear carbonate. When a ratio of the linear carbonate to the cyclic carbonate is about 1:1 to about 9:1 by volume, or about 2:1 to about 8:1, or about 3:1 to about 6:1, the electrolyte may have improved performance.

In an embodiment, the non-aqueous solvent may further include fluoroethylene carbonate (FEC), vinylene carbonate (VC), vinyl ethylene carbonate (VEC), a phosphorus (P)—containing compound, a sulfur (S)—containing compound other than the sulfone compound represented by Formula 2, or the like.

In an embodiment, the non-aqueous solvent may include vinylene carbonate (VC). An amount of the VC is about 3 volume percent (vol %) or less, or about 2 vol % or less, or about 1.5 vol % or less, or about 1 vol % or less, based on a total volume of the non-aqueous solvent. For example, the lithium secondary battery may include about 0.1 volume percent (vol %) to about 3 vol % of VC based on a total volume of the non-aqueous solvent. For example, the lithium secondary battery may include about 0.1 vol % to about 2 vol % of VC, and in an embodiment, about 0.1 vol % to about 1.5 vol %, and in some other embodiments, about 0.1 vol % to about 1 vol %, based on a total volume of the non-aqueous solvent. When the amount of the VC in the non-aqueous solvent is within the above-described ranges, decomposition of the sulfone-based compound may be prevented.

In another embodiment, the non-aqueous solvent may include fluoroethylene carbonate (FEC). An amount of the FEC is about 0.1 volume percent (vol %) or greater, or about 0.5 vol % or greater, or about 1 vol % or greater, and about 10 volume percent (vol %) or less, or about 7 vol % or less, or about 5 vol % or less, based on a total volume of the non-aqueous solvent. For example, the lithium secondary battery may include FEC in an amount of about 0.1 vol % to about 10 vol % based on a total volume of the non-aqueous solvent. In an embodiment, the lithium secondary battery may include FEC in an amount of about 0.5 vol % to about 7 vol %, about 0.5 vol % to about 5 vol %, and in an embodiment, about 1 vol % to about 7 vol %, and in another embodiment, about 2 vol % to about 7 vol %, each based on a total volume of the non-aqueous solvent. When the amount of the FEC in the non-aqueous solvent is within the above-described ranges, an effective solid-electrolyte interphase (SEI), which does not inhibit the diffusion rate of lithium ions, may be rapidly formed.

The electrolyte may include a carbonate including a carbon-carbon single bond, a carbon-carbon double bond, or a carbon-carbon triple bond, a carboxylic anhydride including a carbon-carbon double bond or a carbon-carbon triple bond, or a combination thereof. The carbonate and the carboxylic anhydride may be linear or cyclic.

For example, the electrolyte may further include vinyl ethylene carbonate (VEC), a maleic anhydride, a succinic anhydride, or a combination thereof. For example, the lithium secondary battery may further include VEC, a maleic anhydride, a succinic anhydride, or a combination thereof in an amount of about 0.1 wt % to about 3 wt %, or about 0.1 wt % to about 2.5 wt %, and in an embodiment, about 0.1 wt % to about 2 wt %, based on a total weight of the electrolyte.

For example, the electrolyte may further include a maleic anhydride. For example, the lithium secondary battery may further include a maleic anhydride in an amount of about 0.1 wt % to about 1.5 wt %, and in an embodiment, about 0.1 wt % to about 1.0 wt %, and in some other embodiments, about 0.1 wt % to about 0.5 wt %, based on a total weight of the electrolyte.

For example, the electrolyte may further include a phosphorous (P)—containing compound, a sulfur (S)—containing compound other than the sulfone compound represented by Formula 2, or a combination thereof. For example, the electrolyte may further include a phosphorous (P)—containing compound, a sulfur (S)—containing compound other than the sulfone compound represented by Formula 2, or a mixture thereof in an amount of about 4 wt % or less, in an embodiment, about 0.1 wt % or greater to about 3 wt % or less, and in some other embodiments, about 0.1 wt % or greater to about 2 wt % or less, and in still other embodiments, about 0.5 wt % to about 2 wt %, each based on a total weight of the electrolyte.

The P—containing compound may include a phosphine compound, a phosphite compound, a phosphate compound, or a combination thereof. The S-containing compound other than the sulfone compound represented by Formula 2 may include a sulfone compound, a sulfonate compound, a disulfonate compound, or a combination thereof.

The phosphine compound may be, for example, triphenylphosphine, tris(o-tolyl)phosphine, or tris(butyl)phosphine. However, embodiments are not limited thereto. For example, the phosphite compound may be triethylphosphite (TEPi), trimethylphosphite, tripropylphosphite, tributylphosphite, tris (trimethylsilyl) phosphite, triphenylphosphite, or a combination thereof.

The sulfone compound may include, for example, ethylmethyl sulfone, divinyl sulfone, tetramethylene sulfone, bisphenylsulfone, or a combination thereof. For example, the sulfonate compound may be methyl methane sulfonate, ethyl methane sulfonate, allyl allylsulfonate, or a combination thereof. The disulfonate compound may be, for example, methylene methane disulfonate (MMDS), busulfan, tosyloxydisulfonate, methylene bis(methanesulfonate), or a combination thereof.

As described above, in spite of the ability to implement a high-capacity battery, a lithium metal oxide having a high Ni content may lead to poor lifetime characteristics and increased resistance in a battery due to an increased amount of $Ni^{3+}$ cations. However, in a lithium secondary battery according to an embodiment, including the sulfone-based compound of Formula 2, the sulfone-based compound reacts with and stabilizes $Ni^{3+}$ cations, and thus reduces resistance in the battery. In this regard, when the amount of the sulfone-based compound is greater than 3 wt % based on a total weight of the electrolyte, the sulfone-based compound may form a lithium salt through an irreversible reaction with lithium cations generated from the positive active material, and thus the lithium cation is not involved in the battery characteristics and is consumed.

The sulfone-based compound represented by Formula 2 may be susceptible to being decomposed by a reaction with the negative electrode. As described in further detail below, in a lithium secondary battery containing a negative active material including a metal alloyable with lithium or a carbonaceous negative active material, a gas may be generated by a catalytic reaction that occurs at a high temperature, and as a result, lifetime characteristics of the battery may be deteriorated. As described above, when FEC, VC, VEC, a phosphorous (P)—containing compound, or a sulfur (S)—containing compound is included in electrolyte in the above-described ranges, a passivation film, i.e., a SEI, may be formed on a portion of or on an entirety of a surface of the negative electrode. The SEI may prevent generation of gas by the lithium secondary battery during storage at a high temperature, and thus improve the overall safety and performance of the lithium secondary battery.

Hereinafter, other constituents of the lithium secondary battery according to one or more embodiments will be described in greater detail.

The positive electrode may include a positive active material represented by Formula 1, as described above. For example, in Formula 1, A may be a halogen, S, N, or a combination thereof. However, embodiments are not limited thereto.

For example, in Formula 1, y, which indicates an amount ratio of Ni in the positive active material, may satisfy that $0.7 \leq y \leq 0.98$, and in an embodiment, $0.8 \leq y \leq 0.98$, and in some other embodiments, $0.8 \leq y \leq 0.9$, and in still other embodiments, $0.8 \leq y \leq 0.88$. When the amount of Ni in the positive active material is less than 70% (i.e., in Formula 1, y<0.7), even though the amount of Ni may be sufficient to stabilize the surface of the positive electrode and inhibit deterioration in lifetime characteristics, due to the release of $Ni^{3+}$ cations or disproportionation which occur when using a high-Ni positive active material, resistance may be increased since the sulfone-based compound having a high affinity for $Ni^{3+}$ cations is located on a surface of the positive electrode, thus leading to reduced lifetime characteristics and resistance characteristics.

For example, the positive active material may be represented by Formula 3 or Formula 4.

$$LiNi_yCo_{1-y'-z}Al_zO_2 \qquad \text{Formula 3}$$

$$LiNi_yCo_{1-y'-z}Mn_zO_2 \qquad \text{Formula 4}$$

In Formula 3 and Formula 4, $0.8 \leq y' \leq 0.98$, $0 < z' < 0.1$, and $0 < 1-y'-z' < 0.2$.

For example, the positive electrode may include, as a positive active material, $LiNi_{0.80}Co_{0.15}Mn_{0.05}O_2$, $LiNi_{0.85}CO_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.88}Co_{0.1}Mn_{0.02}O_2$, or a combination thereof. For example, the positive electrode may include as a positive active material, $LiNi_{0.8}Co_{0.15}Mn_{0.05}O_2$, $LiNi_{0.85}Co_{0.1}Mn_{0.05}O_2$, $LiNi_{0.88}Co_{0.05}Mn_{0.04}O_2$, $LiNi_{0.88}Co_{0.08}Al_{0.04}O_2$, $Li_{1.02}Ni_{0.80}Co_{0.15}Mn_{0.05}O_2$, $Li_{1.02}Ni_{0.85}Co_{0.1}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, or a combination thereof. However, embodiments are not limited thereto.

The positive electrode may further include, in addition to the positive active material as described above, lithium cobalt oxide, lithium nickel cobalt manganese oxide, lithium nickel cobalt aluminum oxide, lithium iron phosphate, lithium manganese oxide, or a combination thereof. However, embodiments are not limited thereto and the positive electrode may further include any suitable positive active material.

For example, the positive electrode may further include a compound represented by one of the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aN$-$i_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCO_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$, or a combination thereof.

In the formulae above, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

For example, the positive electrode of the lithium secondary battery according to an embodiment may be prepared according to the following method.

The positive electrode may be formed by coating, drying, and then pressing a positive active material composition onto a positive electrode current collector. A positive active material composition may be prepared as a mixture of the positive active material as described above, a binder, and a solvent.

For example, a conducting agent, a filler, or the like may be further added to the positive active material composition. The positive active material composition may be directly coated on the positive electrode current collector and then dried to form a positive electrode. In some other embodiments, the positive active material composition may be cast on a separate support to form a positive active material film. This positive active material film may then be separated from the support and laminated on the positive electrode current collector, to thereby form the positive electrode.

For example, a loading level of the prepared positive active material composition may be about 30 milligrams per square centimeter ($mg/cm^2$) or greater, and in an embodiment, about 35 $mg/cm^2$ or greater, and in another embodiment, about 40 $mg/cm^2$ or greater. For example, the positive electrode may have an electrode density of about 3 grams per cubic centimeter (g/cc) or greater, and in an embodiment, about 3.5 g/cc or greater, or about 4 g/cc or greater.

In an embodiment, to obtain an increased cell energy density, the loading level of the positive active material composition may be about 35 $mg/cm^2$ or greater to about 50 $mg/cm^2$ or less, and the electrode density of the positive electrode may be about 3.5 g/cc or greater to about 4.2 g/cc or less.

In an embodiment, the positive active material composition may be loaded onto both surfaces of the positive electrode current collector to a loading level of about 37 $mg/cm^2$ in order to achieve an electrode density of about 3.6 g/cc.

When the loading level of the positive active material composition and the electrode density are within the above-described ranges, a lithium secondary battery including the positive active material may have an increased cell energy density of, for example, about 500 watt hours per liter (Wh/L) or greater to about 900 Wh/L or less.

The solvent may be, for example, N-methylpyrrolidone (NMP), acetone, or water. The amount of the solvent in the positive active material composition may be about 10 parts to about 100 parts by weight, or about 10 parts to about 75 parts by weight, or about 30 parts to about 56 parts by weight based on 100 parts by weight of the positive active material. When the amount of the solvent is within the above-described ranges, formation of the positive active material film may be facilitated.

In general, the conducting agent in the positive active material composition may be present in an amount of about 1 wt % to about 30 wt %, or about 5 wt % to about 25 wt %, or about 10 wt % to about 20 wt %, based on a total weight of positive active material composition. The conducting agent may be any material having electrical conductivity, and which does not cause a chemical change in the lithium secondary battery.

Non-limiting examples of the conducting agent may include graphite such as natural graphite or artificial graphite; carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; and a conductive polymer material, such as a polyphenylene derivative. A combination comprising at least two of the foregoing conducting agents may also be used.

The binder in the positive active material composition may facilitate binding between the positive active material and the conducting agent, and binding of the positive active material and the conducting agent to the current collector. For example, the amount of the binder may be about 1 wt % to about 30 wt %, or about 5 wt % to about 25 wt %, or about 7.5 wt % to about 20 wt % based on a total weight of the positive active material composition. Non-limiting examples of the binder include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, polyethylene, polypropylene, polystyrene, polymethyl methacrylate, polyaniline, acrylonitrile butadiene styrene copolymer, phenol resin, epoxy resin, polyethylene terephthalate, polytetrafluoroethylene, polyphenylene sulfide, polyamide imide, polyether imide, polyethylene sulfone, polyamide, polyacetal, polyphenylene oxide, polybutylene terephthalate, an ethylene-propylene-diene monomer (EPDM), sulfonated EPDM, styrene-butadiene rubber (SBR), a fluoro rubber, a copolymer thereof, or a combination thereof.

The filler in the positive active material composition may inhibit expansion of the positive electrode. The filler is optional. The filler may be any suitable fibrous material that does not cause a chemical change in the lithium secondary battery. For example, the filler may be an olefin-based polymer such as polyethylene or polypropylene; or a fibrous material such as glass fiber, carbon fiber, or the like. A combination comprising at least two of the foregoing fillers may also be used.

The amounts of the positive active material, the conducting agent, the filler, the binder, and the solvent may be determined by the person of skill in the art without undue experimentation. At least one of the conducting agent, the filler, the binder, and the solvent may be omitted depending on the use and structure of the lithium secondary battery.

For example, N-methylpyrrolidone (NMP) may be used as the solvent, PVdF or a PVdF copolymer may be used as the binder, and carbon black or acetylene black may be used as the conducting agent. For example, about 94 wt % of the positive active material, about 3 wt % of the binder, and about 3 wt % of the conducting agent may be mixed together to obtain a mixture in power form, and then NMP may be added to the mixture to prepare a slurry having a solids content of about 70 wt %. This slurry may then be coated, dried, and roll-pressed, to thereby manufacture a positive electrode.

The positive electrode current collector may have a thickness of about 3 micrometers (μm) to about 50 μm. The positive electrode current collector is not particularly limited, and may be any material having a high conductivity without causing chemical changes in the fabricated battery. For example, the positive electrode current collector may be stainless steel, aluminum, nickel, titanium, sintered carbon, aluminum or stainless steel that is surface-treated with carbon, nickel, titanium, or silver, or a combination thereof. For example, the positive electrode current collector may be processed to have an uneven surface with fine projections and recesses to enhance the adhesion of the positive active material composition to the surface of the positive electrode current collector. The positive electrode current collector may be in any of various forms, including a film, a sheet, a foil, a net, a porous structure, a foam, and a non-woven fabric.

For example, the negative electrode of the lithium secondary battery according to any of the embodiments may include a negative active material containing a metalloid that is alloyable with lithium and/or a carbonaceous negative active material.

For example, the negative active material containing a metalloid that is alloyable with lithium may include silicon (Si), a Si—C composite material, a silicon oxide ($SiO_{a'}$, wherein 0<a'<2), or a combination thereof.

For example, the Si—C composite material may include Si particles having an average particle diameter of about 200 nanometers (nm) or less, or about 100 nanometers (nm) or less, or about 50 nanometers (nm) or less. For example, the Si—C composite material may have a capacity of about 600 milliampere hours per gram (mAh/g) to about 2000 mAh/g, or about 700 mAh/g to about 1750 mAh/g, and in an embodiment, about 800 mAh/g to about 1600 mAh/g.

For example, the silicon oxide ($SiO_{a'}$) or the Si—C composite material may combined with graphite. For example, a mixture of about 12 wt % of the Si—C composite material having a capacity of about 1300 mAh/g, 85 wt % of graphite, and about 3 wt % of a binder, may be used to provide a negative electrode having a capacity of about 500 mAh/g. This negative electrode may have improved performance, relative to the use of only a silicon oxide ($SiO_{a'}$) having a capacity of about 500 mAh/g or Si—C composite material.

In addition to the above-described negative active materials, the negative electrode may include Sn, Al, Ge, Pb, Bi, Sb, an Si—Y' alloy (wherein Y' may be an alkaline metal, an alkaline earth metal, a Group 13 element, a Group 14 element, a Group 15 element, a Group 16 element, a transition metal, a rare earth element, or a combination thereof, but may not be Si), an Sn—Y' alloy (wherein Y' may be an alkaline metal, an alkaline earth metal, a Group 13 element, a Group 14 element, a Group 15 element, a Group 16 element, a transition metal, a rare earth element, or a combination thereof, but may not be Sn), or a combination thereof. The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof.

For example, the negative electrode of the lithium secondary battery according to any of the embodiments may be prepared according to the following method.

The negative electrode may be formed by coating, drying, and the pressing a negative active material composition onto a negative electrode current collector. The negative active material composition may be prepared as a mixture of such a negative active material as described above, a binder, and a solvent as needed.

For example, a conducting agent, a filler, or the like may be further added to the negative active material composition. The binder, the solvent, conducting agent, and the filler used in the negative active material composition may be the same as those used in the positive active material composition.

The negative active material composition may include water as a solvent, unlike the positive active material composition. For example, the negative active material composition may include water as a solvent; carboxymethyl cellulose (CMC), styrene-butadiene rubber (SBR), an acrylate polymer, a methacrylate polymer, or a combination thereof as a binder; and carbon black, acetylene black, graphite, or a combination thereof as a conducting agent. For example, about 94 wt % of a negative active material including a Si—C composite material and graphite, about 3 wt % of the binder, and about 3 wt % of the conducting agent may be mixed together to obtain a mixture in powder form, and water may be added to the mixture to prepare a slurry having a solids content of about 70 wt %. This slurry may then be coated, dried, and roll-pressed, to thereby manufacture a negative electrode.

A loading level of the negative active material composition may be determined according to the loading level of the positive active material composition.

For example, a loading level of the negative active material composition may be about 12 mg/cm$^2$ or greater, and in some example embodiments, about 15 mg/cm$^2$ or greater, or about 20 mg/cm$^2$ or greater, depending on the capacity per gram of the negative active material composition. For example, the negative electrode may have an electrode density of about 1.5 g/cc or greater, and in some example embodiments, about 1.6 g/cc or greater, or about 1.7 g/cc or greater.

The negative electrode may have a capacity of about 380 mAh/g to about 800 mAh/g, or about 400 mAh/g to about 800 mAh/g, or about 450 mAh/g to about 650 mAh/g. The capacity per gram may be controlled by adjusting a weight ratio of the graphite and the Si—C composite material. A mixture of about 84 wt % of graphite having a capacity of about 360 mAh/g, about 14 wt % of the Si—C composite material having a capacity of about 1300 mAh/g, and about 2 wt % of a binder, may be used to provide a negative electrode having a capacity of about 500 mAh/g. In some other embodiments, a mixture of the Si—C composite material and the silicon oxide (SiO$_a$) may be used to provide a negative electrode having a capacity of about 380 mAh/g to about 800 mAh/g. When a capacity of the negative electrode is less than 380 mAh/g, an expected effect of the mixture may not be obtained. On the other hand, when the capacity of the negative electrode exceeds 800 mAh/g, a significant reduction in capacity retention may occur.

In an embodiment, for an energy density-oriented design, a loading level of the negative active material composition may be about 15 mg/cm$^2$ or greater to about 25 mg/cm$^2$ or less, and an electrode density of the negative electrode may be about 1.6 g/cc or greater to about 2.3 g/cc or less.

When a loading level of the negative active material composition and a negative electrode density are within the above-described ranges, a lithium secondary battery including such a negative active material may exhibit a high cell energy density of about 500 Wh/L or greater, or about 600 Wh/L or greater, or about 650 Wh/L or greater.

The negative electrode current collector may have a thickness of about 3 µm to about 50 µm, or about 5 µm to about 45 µm, or about 10 µm to about 40 µm. The negative electrode current collector is not particularly limited, and may be any material having suitable conductivity, that does not cause a chemical change in the fabricated battery. For example, the negative electrode current collector may be copper; stainless steel; aluminum; nickel; titanium; sintered carbon; copper or stainless steel that is surface-treated with carbon, nickel, titanium, or silver; an aluminum-cadmium alloy; or a combination thereof. Similar to the positive electrode current collector, the negative electrode current collector may be processed to have an uneven surface with fine projections and recesses to enhance the adhesion of the negative active material composition to the surface of the negative electrode current collector. The negative electrode current collector may be in any of various forms, including a film, a sheet, a foil, a net, a porous structure, a foam, and a non-woven fabric.

In an embodiment, after 300 cycles of charging and discharging at a temperature of about 45° C. at a 0.3 C to 1 C/0.3 C to 1 C charge/discharge current, a 2.8 volt (V) to 4.2 to 4.3 V operating voltage, and a constant current-constant voltage (CC-CV) 1/10C cutoff condition, the lithium secondary battery may have a direct current internal resistance (DCIR) increase rate of about 150% or less, or about 145% or less, or about 140% or less. In an embodiment, the lithium secondary battery has a DCIR increase rate which is at least 25% lower, or at least 30% lower than a DCIR increase rate of a lithium secondary battery including an electrolyte including the lithium salt and the non-aqueous solvent, and not including the sulfone compound represented by Formula 2. A C rate means a current which will discharge a battery in one hour, e.g., a C rate for a battery having a discharge capacity of 1.6 ampere-hours would be 1.6 amperes.

That is, the lithium secondary battery according to any of the embodiments may have a significantly reduced DCIR increase rate and improved battery characteristics, compared to a conventional high-Ni lithium secondary battery.

For example, an operating voltage of the lithium secondary battery may be from about 2.8 V to about 4.2 to 4.3 V.

For example, the lithium secondary battery may have an energy density of about 500 Wh/L or greater, or about 600 Wh/L or greater, or about 750 Wh/L or greater.

In an embodiment, the lithium secondary battery according to one or more embodiments may further include a separator between the positive electrode and the negative electrode. The separator may be an insulating thin film having excellent ionic permeability and strong mechanical strength. In general, the separator may have a pore diameter of about 0.001 µm to about 1 µm, or about 0.01 µm to about 1 µm, or about 0.05 µm to about 0.1 µm, and a thickness of about 3 µm to about 30 µm, or about 5 µm to about 25 µm, or about 10 µm to about 20 µm. The separator may be, for example, an olefin-based polymer such as polypropylene or the like having resistance to chemicals and hydrophobic characteristics; or a sheet or non-woven fabric made of glass fiber, polyethylene, or the like. When a solid electrolyte, for example, a polymer electrolyte is used, the solid electrolyte may also serve as the separator.

In some example embodiments, in addition to the above-described electrolytes, the electrolyte may further include an organic solid electrolyte, an inorganic solid electrolyte, or a combination thereof.

The organic solid electrolyte may include, for example, a polyethylene derivative, a polyethylene oxide derivative, a polypropylene oxide derivative, a phosphoric acid ester polymer, polyester sulfide, polyvinyl alcohol, polyvinylidene fluoride, a polymer including ionic dissociative groups, or a combination thereof.

The inorganic solid electrolyte may include a lithium nitride, a lithium halide, or a lithium sulfate, for example, Li$_3$N, LiI, Li$_5$NI$_2$, Li$_3$N—LiI—LiOH, Li$_2$SiS$_3$, Li$_4$SiO$_4$, Li$_4$SiO$_4$—LiI—LiOH, or Li$_3$PO$_4$—Li$_2$S—SiS$_2$. A combination comprising at least two of the foregoing inorganic solid electrolytes may also be used.

The lithium secondary battery according to one or more embodiments may be manufactured using any suitable method, for example, by injecting an electrolyte solution between the positive electrode and the negative electrode.

The above-described positive electrode, negative electrode, and separator may be wound or folded, and then housed in a battery case. Subsequently, an electrolyte may be injected into the battery case, and the battery case may then be sealed with a cap assembly to thereby complete the manufacture of a lithium secondary battery. For example, the battery case may be a cylindrical type, a rectangular type, or a thin-film type.

The lithium secondary battery according to one or more embodiments may be a winding or a stack type according to a shape of the electrodes. The lithium secondary battery according to one or more embodiments may be classified into a cylindrical type, a rectangular type, a coin type, or a pouch type according to the type of exterior material.

A method of manufacturing the lithium secondary battery according to one or more embodiments may be determined by the person of skill in the art without undue experimentation, and thus a detailed description thereof is omitted herein.

In an embodiment, a plurality of lithium secondary batteries according to one or more embodiments may be used together as a unit cell in a battery module.

In some other embodiments, the battery module may be included in a battery pack.

In some other embodiments, the battery pack may be included in a device. For example, this device may be used in, for example, power tools actuated by electric motors; electric vehicles (EVs), including hybrid electric vehicles (HEVs), plug-in hybrid electric vehicles (PHEV), and the like; electric two-wheeled vehicles, including electric bicycles and electric scooters; electric golf carts; or power storage systems. However, embodiments are not limited thereto.

A lithium secondary battery according to one or more embodiments may be used for various purposes under high-power, high-voltage, and high-temperature operating conditions.

One or more embodiments of the present disclosure will now be described in detail with reference to the following examples. However, these examples are only for illustrative purposes and are not intended to limit the scope of the one or more embodiments of the present disclosure.

Example 1

(Manufacture of Positive Electrode)

$LiNi_{0.8}Co_{0.15}Mn_{0.05}O_2$ as a positive active material, carbon black as a conducting agent, and PVdF as a binder were added in a weight ratio of about 94:3:3 to N-methylpyrrolidone (NMP) and mixed together to prepare a positive active material slurry. This positive active material slurry was coated on both surfaces of an aluminum film having a thickness of about 16 μm, such that about 37 mg/cm$^2$ of the positive active material slurry was dispersed on each surface, followed by drying and roll pressing, thereby manufacturing a positive electrode having an electrode density of about 3.6 g/cc.

(Manufacture of Negative Electrode)

Graphite, CMC, and SBR were added in a weight ratio of about 98:1.5:0.5 to NMP and mixed together to prepare a negative active material slurry. This negative active material slurry was coated on both surfaces of a copper foil having a thickness of about 10 μm such that about 21.86 mg/cm$^2$ of the negative active material slurry was dispersed on each surface, dried, and then roll-pressed, thereby manufacturing a negative electrode having an electrode density of about 1.65 g/cc.

(Preparation of Electrolyte)

An electrolyte was prepared by adding about 1.5 wt % of vinylene carbonate (VC) and about 1 wt % of bis(4-fluorophenyl)sulfone ("4FS"), based on a total weight of the electrolyte, to a mixture of EC/EMC/DMC (in a volume ratio of about 2:4:4) including 1.15 M $LiPF_6$.

(Manufacture of Lithium Secondary Battery)

A lithium secondary battery was manufactured by injecting the electrolyte in between the positive electrode and the negative electrode with a polypropylene separator having a thickness of about 16 μm disposed between the positive and negative electrodes.

Example 2

A lithium secondary battery was manufactured in the same manner as in Example 1, except that about 2 wt % of 4FS was used, instead of about 1 wt % of 4FS.

Example 3

A lithium secondary battery was manufactured in the same manner as in Example 1, except that $LiNi_{0.85}Co_{0.1}Mn_{0.05}O_2$ was used as the positive active material, instead of $LiNi_{0.8}Co_{0.15}Mn_{0.05}O_2$.

Example 4

A lithium secondary battery was manufactured in the same manner as in Example 1, except that $LiNi_{0.88}Co_{0.08}Mn_{0.04}O_2$ was used as the positive active material, instead of $LiNi_{0.8}Co_{0.15}Mn_{0.05}O_2$.

Example 5

A lithium secondary battery was manufactured in the same manner as in Example 4, except that about 2 wt % of 4FS was used, instead of about 1 wt % of 4FS.

Example 6

A lithium secondary battery was manufactured in the same manner as in Example 1, except that $LiNi_{0.88}Co_{0.08}Al_{0.04}O_2$ was used as the positive active material, instead of $LiNi_{0.8}Co_{0.15}Mn_{0.05}O_2$.

Example 7

A lithium secondary battery was manufactured in the same manner as in Example 6, except that about 1 wt % of bis(3,4-difluorophenyl)sulfone ("4BFS") was used, instead of about 1 wt % of 4FS.

Comparative Example 1

A lithium secondary battery was manufactured in the same manner as in Example 1, except that the electrolyte was prepared without 1 wt % of 4FS.

Comparative Example 2

A lithium secondary battery was manufactured in the same manner as in Example 1, except that about 5 wt % of 4,4-dicarboxy diphenyl sulfone was used, instead of about 1 wt % of 4FS.

Comparative Example 3

A lithium secondary battery was manufactured in the same manner as in Example 1, except that about 5 wt % of methylphenyl sulfone was used, instead of about 1 wt % of 4FS.

Comparative Example 4

A lithium secondary battery was manufactured in the same manner as in Example 1, except that a mixture of about 0.5 wt % of 4FS and about 10 wt % of γ-butyrolactone was used, instead of about 1 wt % of 4FS.

Comparative Example 5

A lithium secondary battery was manufactured in the same manner as in Example 1, except that $LiNi_{0.60}Co_{0.20}Mn_{0.20}O_2$ was used as the positive active material, instead of $LiNi_{0.8}Co_{0.15}Mn_{0.05}O_2$.

Example 8

(Manufacture of Positive Electrode)
A positive electrode was manufactured in the same manner as in Example 1.
(Manufacture of Negative Electrode)
SCN (an active material prepared by dispersing Si particles having an average particle diameter of 100 nm on graphite particles, followed by carbon coating to have a capacity of about 1300 mAh/g, available from BTR), graphite, CMC, and SBR were added in a weight ratio of about 14:84:1.5:0.5 to NMP, and mixed to prepare a negative active material slurry. This negative active material slurry was coated on both surfaces of a copper foil having a thickness of about 10 μm, such that about 16.5 mg/cm² of the negative active slurry was dispersed on each surface, followed by drying and roll pressing, thereby manufacturing a negative electrode having an electrode density of about 1.65 g/cc. The SCN included Si particles on graphite.
(Preparation of Electrolyte)
An electrolyte was prepared by adding about 1.5 wt % of vinylene carbonate (VC) and about 1 wt % of bis(4-fluorophenyl)sulfone ("4FS"), based on a total weight of the electrolyte, to a mixture of FEC/EC/EMC/DMC (in a volume ratio of about 7:7:46:40) including 1.15 M $LiPF_6$.
(Manufacture of Lithium Secondary Battery)
A lithium secondary battery was manufactured by injecting the electrolyte in between the positive electrode and the negative electrode with a polypropylene separator having a thickness of about 16 μm disposed between the positive and negative electrodes.

Example 9

A lithium secondary battery was manufactured in the same manner as in Example 8, except that about 2 wt % of 4FS was used, instead of about 1 wt % of 4FS.

Example 10

A lithium secondary battery was manufactured in the same manner as in Example 8, except that $LiNi_{0.85}Co_{0.1}Mn_{0.05}O_2$ was used as the positive active material, instead of $LiNi_{0.8}Co_{0.15}Mn_{0.05}O_2$.

Example 11

A lithium secondary battery was manufactured in the same manner as in Example 8, except that $LiNi_{0.88}Co_{0.08}Mn_{0.04}O_2$ was used as the positive active material, instead of $LiNi_{0.8}Co_{0.15}Mn_{0.05}O_2$.

Example 12

A lithium secondary battery was manufactured in the same manner as in Example 11, except that about 1 wt % of 4BFS was used, instead of about 1 wt % of 4FS.

Example 13

A lithium secondary battery was manufactured in the same manner as in Example 8, except that $LiNi_{0.88}Co_{0.08}Al_{0.04}O_2$ was used as the positive active material, instead of $LiNi_{0.8}Co_{0.15}Mn_{0.05}O_2$.

Example 14

A lithium secondary battery was manufactured in the same manner as in Example 13, except that about 1 wt % of 4BFS was used, instead of about 1 wt % of 4FS.

Comparative Example 6

A lithium secondary battery was manufactured in the same manner as in Example 8, except that the electrolyte was prepared without about 1 wt % of 4FS.

Comparative Example 7

A lithium secondary battery was manufactured in the same manner as in Example 8, except that about 5 wt % of 4,4-dicarboxy diphenylsulfone was used, instead of about 1 wt % of 4FS.

Comparative Example 8

A lithium secondary battery was manufactured in the same manner as in Example 8, except that a mixture of graphite and PVDF in a weight ratio of about 92:8 was used, instead of the mixture of SCN, graphite, CMC, and SBR in a weight ratio of about 14:84:1.5:0.5, and a mixture of about 0.5 wt % of 4FS and about 10 wt % of γ-butyrolactone was used, instead of about 1 wt % of 4FS.

Comparative Example 9

A lithium secondary battery was manufactured in the same manner as in Example 8, except that $LiNi_{0.06}Co_{0.20}Mn_{0.20}O_2$ was used as the positive active material, instead of $LiNi_{0.8}Co_{0.15}Mn_{0.05}O_2$.

Evaluation Example: Lifetime and Resistance Evaluation (1) Graphite as a Negative Active Material and a Sulfone-Based Compound and VC as Additives.
DCIR increase rates and lifetimes of the lithium secondary batteries manufactured in Examples 1 to 7 and Comparative Examples 1 to 5 were evaluated after 300 cycles of charging and discharging at about 45° C. at a 1 C/1 C charge/discharge current, a 2.8 V to 4.3 V operating voltage, and a CC-CV 1/10 C cutoff condition. The results are shown in Table 1. A ratio of the capacity after the 300 charge-discharge cycles to the capacity after initial charging and discharging was calculated and determined as the lifetime of each lithium secondary battery.

TABLE 1

| Example | Lifetime (%) | DCIR increase rate (%) |
| --- | --- | --- |
| Example 1 | 89 | 131 |
| Example 2 | 87 | 136 |
| Example 3 | 88 | 138 |
| Example 4 | 86 | 138 |
| Example 5 | 86 | 133 |
| Example 6 | 85 | 136 |
| Example 7 | 84 | 131 |
| Comparative Example 1 | 82 | 162 |
| Comparative Example 2 | 73 | 181 |
| Comparative Example 3 | 75 | 172 |
| Comparative Example 4 | 71 | 177 |
| Comparative Example 5 | 78 | 162 |

Referring to Table 1, the lithium secondary batteries of Examples 1 to 7, each containing the electrolyte including a sulfone-based compound, were found to have improved lifetime characteristics and reduced DCIR increase rates, compared to the lithium secondary battery of Comparative Example 1 not including a sulfone-based compound.

Without being limited by theory, it is believed that the results are attributed to the sulfone-based compound formed a stable protective film on the surface of the negative electrode including graphite, so that electrochemical characteristics of the negative electrode were maintained even after the repeated charging and discharging cycles.

However, the lithium secondary battery of Comparative Example 5 using the positive electrode including a lower amount of Ni, relative to the lithium secondary batteries of Examples 1 to 7, had an increased resistance and consequently a reduced lifetime and an increased DCIR increase rate. Without being limited by theory, it is understood that the increased resistance is due to the sulfone-based compound present on the surface of the positive electrode, having an affinity for $Ni^{3+}$ cations.

The lithium secondary batteries of Comparative Examples 2 and 3 including a sulfone-based compound not containing a halogen were found to have a reduced lifetime and a greater DCIR increase rate, since the release of $Ni^{3+}$ cations was not effectively blocked.

The lithium secondary battery of Comparative Example 4 including about 0.5 wt % of the sulfone-based compound was found to have a reduced lifetime and a greater DCIR increase rate, which are attributed to the amount of the sulfone-based compound as being insufficient to effectively block the release of $Ni^{3+}$ cations.

(2) Si-Graphite Composite Material as a Negative Active Material, and a Sulfone-Based Compound, VC and FEC as Additives.

DCIR increase rates and lifetimes of the lithium secondary batteries manufactured in Examples 8 to 14 and Comparative Examples 6 to 9 were evaluated after 300 cycles of charging and discharging at about 45° C. at a 1 C/1 C charge/discharge current, a 2.8 V to 4.3 V operating voltage, and a CC-CV 1/10 C cutoff condition. The results are shown in Table 2. A ratio of the capacity after the 300 charge-discharge cycles to the capacity after initial charging and discharging was calculated and determined as the lifetime of each lithium secondary battery.

TABLE 2

| Example | Lifetime (%) | DCIR increase rate (%) |
| --- | --- | --- |
| Example 8 | 84 | 133 |
| Example 9 | 85 | 136 |
| Example 10 | 83 | 133 |
| Example 11 | 83 | 133 |
| Example 12 | 84 | 132 |
| Example 13 | 82 | 134 |
| Example 14 | 81 | 134 |
| Comparative Example 6 | 76 | 172 |
| Comparative Example 7 | 65 | 188 |
| Comparative Example 8 | 64 | 177 |
| Comparative Example 9 | 73 | 165 |

Referring to Table 2, the lithium secondary batteries of Examples 8 to 14, each containing the electrolyte including a sulfone-based compound, were found to have improved lifetime characteristics and reduced DCIR increase rates, compared to the lithium secondary battery of Comparative Example 6 not including a sulfone-based compound.

Without being limited by theory, it is believed that these results are attributed to the sulfone-based compound forming a stable protective film on the surface of the negative electrode including the Si-graphite composite material, so that electrochemical characteristics of the negative electrode were maintained even after the repeated charging and discharging cycles, as in the graphite negative electrode.

However, the lithium secondary battery of Comparative Example 9 using the positive electrode including a lower amount of Ni, relative to the lithium secondary batteries of Examples 8 to 14, was found to have an increased resistance and consequently a reduced lifetime and an greater DCIR increase rate, due to the sulfone-based compound present on the surface of the positive electrode, having an affinity to $Ni^{3+}$ cations.

The lithium secondary battery of Comparative Example 7 including a sulfone-based compound not containing a halogen was found to have a reduced lifetime and an increased DCIR increase rate, since the release of $Ni^{3+}$ cations was not effectively blocked.

The lithium secondary battery of Comparative Example 8 including about 0.5 wt % of the sulfone-based compound was found to have a reduced lifetime and a greater DCIR increase rate, which are attributed to the amount of the sulfone-based compound being insufficient to effectively block the release of $Ni^{3+}$ cations.

As described above, according to the one or more embodiments, using a positive active material of Formula 1 having an increased Ni content to increase capacity and an electrolyte including a sulfone-based compound of Formula 2, a lithium secondary battery may have improved lifetime characteristics and resistance characteristics.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described, it will be understood by those of ordinary skill in the art that various changes in form and details may be made therein without departing from the spirit and scope as defined by the following claims.

What is claimed is:

1. A lithium secondary battery comprising:
a positive electrode;
a negative electrode; and an electrolyte between the positive electrode and the negative electrode, wherein the positive electrode comprises a positive active material represented by Formula 1, and the electrolyte comprises a lithium salt, a non-aqueous solvent, and a sulfone compound, $$Li_xNi_yM_{1-y}O_{2-z}A_z \quad \text{Formula 1}$$

wherein, in $$9 \leq x \leq 1.2, 0.8 \leq y \leq 0.98, 0 \leq z \leq 0.2 \quad \text{Formula 1}$$

M comprises Al, Mg, Mn, Co, Fe, Cr, V, Ti, Cu, B, Ca, Zn, Zr, Nb, Mo, Sr, Sb, W, Bi, or a combination thereof, and A is a monovalent anion, a divalent anion, a trivalent anion or a combination thereof, and wherein the sulfone compound comprises a compound of Compounds 7 to 16, or a combination thereof,

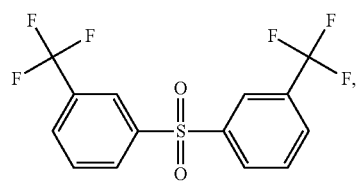

Compound 7

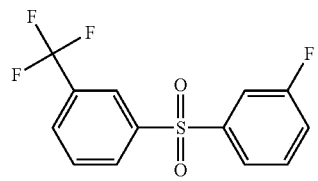

Compound 8

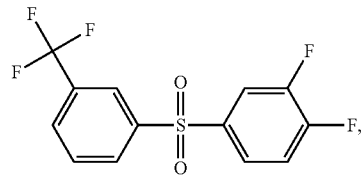

Compound 9

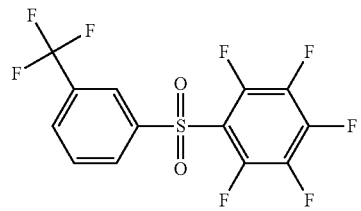

Compound 10

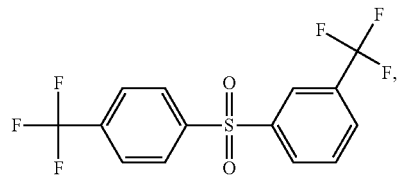

Compound 11

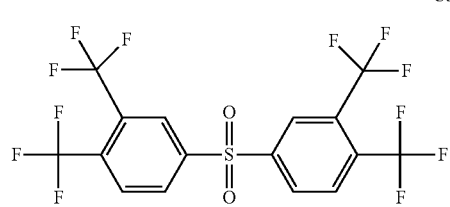

Compound 12

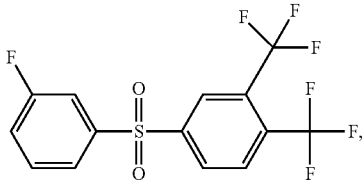

Compound 13

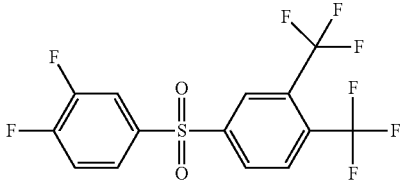

Compound 14

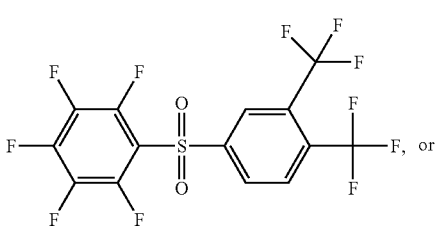

Compound 15

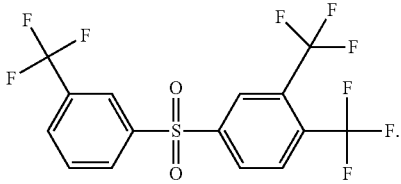

Compound 16

2. The lithium secondary battery of claim 1, wherein the non-aqueous solvent comprises vinylene carbonate.

3. The lithium secondary battery of claim 2, wherein an amount of the vinylene carbonate is about 0.1 volume percent to about 3 volume percent, based on a total volume of the non-aqueous solvent.

4. The lithium secondary battery of claim 1, wherein the non-aqueous solvent comprises fluoroethylene carbonate.

5. The lithium secondary battery of claim 4, wherein an amount of the fluoroethylene carbonate is about 0.1 volume percent to about 10 volume percent, based on a total volume of the non-aqueous solvent.

6. The lithium secondary battery of claim 1, wherein the positive active material is represented by Formula 3, Formula 4, or a combination thereof:

$$LiNi_{y'}Co_{1-y'-z'}Al_{z'}O_2, \text{ or} \quad \text{Formula 3}$$

$$LiNi_{y'}Co_{1-y'-z'}Mn_{z'}O_2, \quad \text{Formula 4}$$

wherein, in Formulae 3 and 4, y' and z' are each independently $0.8 \leq y' \leq 0.98$, $0 \leq z' \leq 0.1$, and $0 < 1-y'-z' < 0.2$.

7. The lithium secondary battery of claim 6, wherein the positive active material is represented by Formula 3 or Formula 4, and wherein $0.8 < y' < 0.9$.

8. The lithium secondary battery of claim 1, wherein the positive electrode comprises $LiNi_{0.80}Co_{0.15}Mn_{0.05}O_2$, $LiNi_{0.85}Co_{0.1}Mn_{0.05}O_2$, $LiNi_{0.88}Co_{0.08}Mn_{0.04}O_2$, $LiNi_{0.88}Co_{0.08}Al_{0.04}O_2$, $Li_{1.02}Ni_{0.80}Co_{0.15}Mn_{0.05}O_2$, $Li_{1.02}Ni_{0.85}Co_{0.10}Mn_{0.05}O_2$, $Li_{1.02}Ni_{0.88}Co_{0.08}Mn_{0.04}O_2$, $Li_{1.02}Ni_{0.88}Co_{0.08}Al_{0.04}O_2$, $LiNi_{0.8}Co_{0.15}Al_{0.05}O_2$, $LiNi_{0.88}Co_{0.1}Al_{0.02}O_2$, $LiNi_{0.85}Co_{0.1}Al_{0.05}O_2$, $LiNi_{0.88}Co_{0.1}Mn_{0.02}O_2$, or a combination thereof.

9. The lithium secondary battery of claim 1, wherein the negative electrode comprises a negative active material comprising a metal that is alloyable with lithium, a carbonaceous negative active material, or a combination thereof.

10. The lithium secondary battery of claim 9, wherein the negative active material comprises a metalloid that is alloyable with lithium, and
   wherein the metalloid that is alloyable with lithium comprises Si, a Si—C composite material, $SiO_{a'}$ wherein $0<a'<2$, or a combination thereof.

11. The lithium secondary battery of claim 10, wherein the Si—C composite material comprises Si particles having an average diameter of about 200 nanometers or less.

12. The lithium secondary battery of claim 1, wherein the lithium secondary battery has a cell energy density of about 500 watt hours per liter or greater.

13. A method of preparing the lithium secondary battery of claim 1, the method comprising:
   disposing the electrolyte between the positive electrode and the negative electrode.

14. The lithium secondary battery of claim 1, wherein the lithium salt comprises lithium difluoro(oxalato)borate, lithium bis(oxalato)borate, lithium difluoro bis(oxalato) phosphate, $LiBF_4$, $LiPF_6$, $LiCF_3SO_3$, $(CF_3SO_2)_2NLi$, $(FSO_2)_2NLi$, or a combination thereof.

15. The lithium secondary battery of claim 1, wherein the negative electrode comprises a negative active material comprising a metal that is alloyable with lithium, a carbonaceous negative active material, or a combination thereof.

\* \* \* \* \*